United States Patent [19]

Kayser et al.

[11] Patent Number: 5,655,444

[45] Date of Patent: Aug. 12, 1997

[54] CALENDER FOR WEBS OF PAPER

[75] Inventors: Franz Kayser, Geldern; Rolf van Haag, Kerken, both of Germany

[73] Assignee: Voith Sulzer Finishing GmbH, Krefeld, Germany

[21] Appl. No.: 599,952

[22] Filed: Feb. 14, 1996

[30] Foreign Application Priority Data

Feb. 23, 1995 [DE] Germany ............... 195 06 301.5

[51] Int. Cl.$^6$ ................ B30B 3/04; B30B 15/34; F16C 13/00
[52] U.S. Cl. ............... 100/334; 100/155 R; 100/162 B; 492/7; 492/20; 492/46; 492/56
[58] Field of Search .............. 100/93 RP, 155 R, 100/162 B, 176; 492/7, 20, 46, 52, 53, 56, 59

[56] References Cited

U.S. PATENT DOCUMENTS

| | | | |
|---|---|---|---|
| 620,286 | 2/1899 | Dodge | 100/155 R |
| 2,685,548 | 8/1954 | Drozdowski | 100/176 |
| 3,673,025 | 6/1972 | Fukuyama et al. | 492/56 |
| 4,078,286 | 3/1978 | Takiguichi et al. | 492/56 |
| 4,324,177 | 4/1982 | Tsuji et al. | 100/155 R |
| 4,534,829 | 8/1985 | Ahrweiler et al. | 100/176 |
| 4,594,068 | 6/1986 | Bardutzky et al. | 492/56 |
| 5,023,985 | 6/1991 | Salo et al. | |
| 5,123,340 | 6/1992 | Kiema et al. | 100/93 RP |
| 5,227,853 | 7/1993 | Proulx et al. | 492/56 |
| 5,318,670 | 6/1994 | Link et al. | 100/93 RP |
| 5,393,290 | 2/1995 | Lehmann et al. | 492/20 |

FOREIGN PATENT DOCUMENTS

| | | | |
|---|---|---|---|
| 84 06 019 | 5/1984 | Germany. | |
| 41 26 232 | 11/1992 | Germany. | |
| 61-148917 | 9/1986 | Japan. | |
| 1-286890 | 11/1989 | Japan | 100/155 R |
| 3-76890 | 4/1991 | Japan. | |
| 3-260198 | 11/1991 | Japan. | |
| 4-57988 | 2/1992 | Japan. | |
| 5-331793 | 12/1993 | Japan. | |
| 986734 | 3/1965 | United Kingdom | 492/56 |
| 2057092 | 3/1981 | United Kingdom | 492/56 |

*Primary Examiner*—Stephen F. Gerrity
*Attorney, Agent, or Firm*—Darby & Darby

[57] ABSTRACT

A calender for webs of paper includes a hard roller having a smooth outer surface. A soft roller is disposed adjacent to the hard roller and forms a roll gap therebetween. The soft roller has a coating made of flexible plastic. The coating includes an inner layer and an outer layer. The inner layer is made of a first plastic material and the outer layer is made of a second plastic material. The outer layer has lesser flexibility and greater hardness than the inner layer. The outer layer has an outer surface having wear properties such that under normal operating conditions the average roughness $R_a$ does not exceed 0.5 μm.

14 Claims, 1 Drawing Sheet

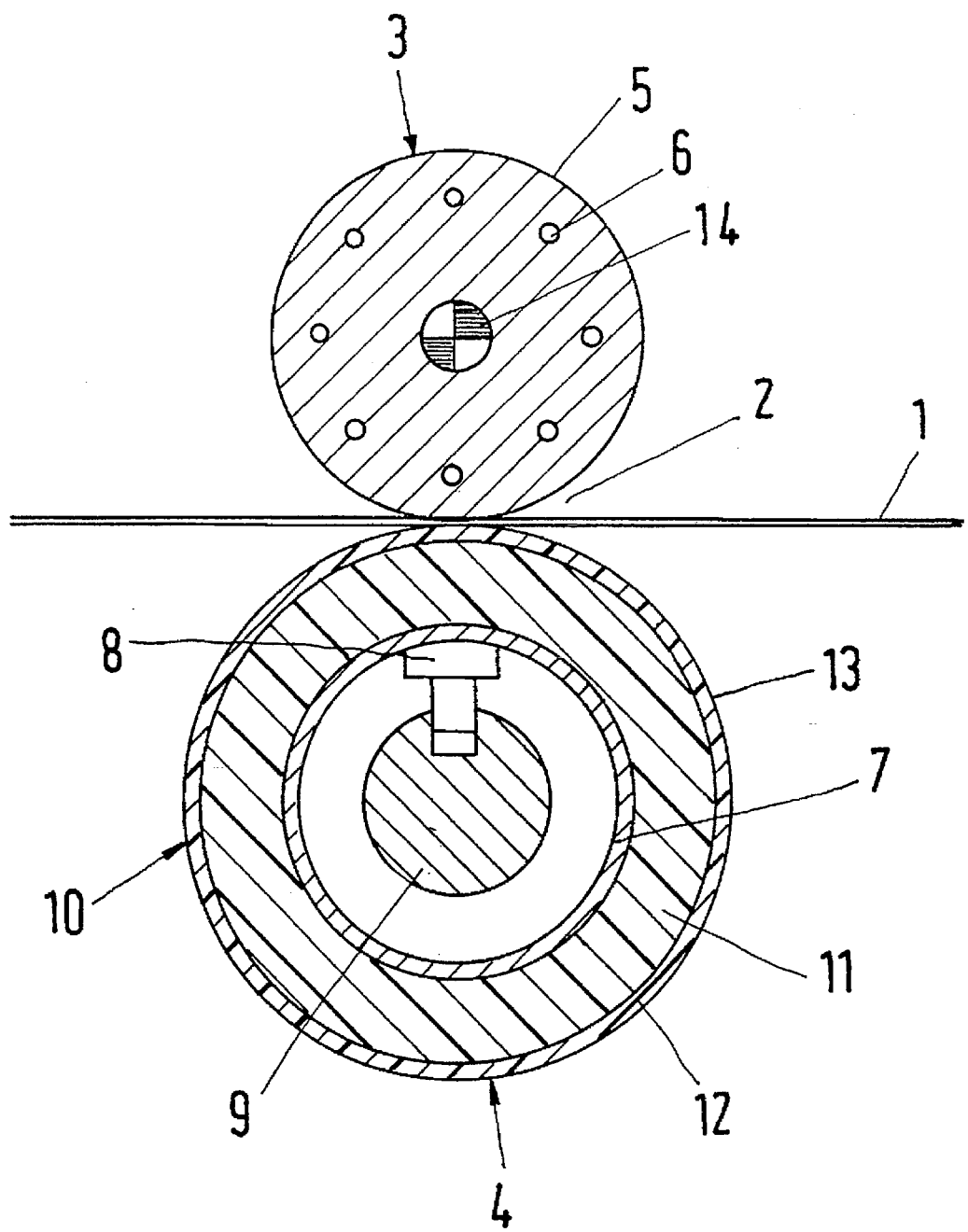

CALENDER FOR WEBS OF PAPER

BACKGROUND OF THE INVENTION

1. Field of the Invention

The present invention relates to a calender for webs of paper having at least two rollers to form a roll gap therebetween. More specifically, the present invention relates to a calender having a "hard" roller which is made of metal and has a smooth surface, and a "soft" roller which has a coating made of flexible plastic.

2. Discussion of the Related Art

Calenders having a hard and soft roller are commercially available and are known as "soft calenders". The smoothness and gloss of the webs of paper is created by the smooth surface of the hard roller. A uniform compression of the paper is created because of the flexible coating on the soft roller. To provide both sides of the paper with gloss and smoothness, the web of paper must run through at least two roll gaps, where the hard rollers of the two gaps are placed on opposites sides of the web of paper. Soft calenders can also be used as in-line calenders in a paper machine because the plastic coating of the soft roller is substantially less sensitive than a coating made of paper. In other words, because the soft roller has to be taken out of service and reworked only in exceptional cases, soft calenders can also be used in paper machines.

German reference DE 41 26 232 A1 teaches that a calender roller that has a plastic coating can be provided on the outside with a thin metallic layer of material having good thermal conductivity properties to direct heat to or away from the roll gap. In particular, this layer can be made of a metal that has a glassy smooth or highly glossy surface.

In addition, German reference DE-U-84 06 019 teaches that a hollow, cylindrical roller body can be made from a carbon-fiber reinforced plastic. The plastic roller has a jacket, which is coated with a metal that is resistant to centrifugal force and has a thickness of 10 to 1,000 μm.

SUMMARY OF THE INVENTION

It is an object of the present invention to provide a soft calender in which a web of paper can be compressed and smoothed on both sides at the same time in one roll gap.

This object is achieved in accordance with a preferred embodiment of the present invention by providing the coating of the soft roller with an inner layer made of a first plastic material and an outer layer made of a second plastic material. The outer layer has lesser flexibility and greater hardness than the inner layer. The outer layer has an outer surface that is smooth and possesses wear properties such that under normal operating conditions the average roughness does not exceed 0.5 μm.

With this configuration of the coating of the soft roller, a plastic such as was previously used for such flexible coatings can be used as the inner layer. By contrast, the outer layer uses a plastic which can be given, by means of processing, a smooth outer surface that is as smooth as that of the hard roller. This outer layer retains this smooth surface even under wear conditions that are common during normal operation. As a result, the calender can be used as an in-line calender. The second plastic possesses greater hardness and less flexibility than the first plastic. Even though the outer layer does indeed deform during normal operating conditions, it does not break because the outer layer is supported by the inner layer. An improvement in the gloss and smoothness on both sides of the web of paper is obtained because the surfaces of both rollers are smooth, yet the surface of one of the rollers has some radial play or flexibility. Thus, the compression of a web of paper in one single roll gap can be achieved by the present invention.

In a preferred embodiment, the second plastic is a silicone rubber. Surprisingly, this material has wear properties that always assure a smooth surface. In addition, it is known that this plastic can be produced in various degrees of hardness. As a result, the requirements for great smoothness can be met even under normal operating conditions.

It is expedient that the first plastic be an epoxy resin as this material is known to be a flexible coating for soft rollers of soft calenders. However, polyester resins, phenol formaldehyde resins, etc., may also be used.

The average roughness of the outer surface has a preferred maximum value of about 0.1 μm. The plastic of the outer layer can then actually be provided with an outer surface that is, and remains, as smooth as the outer surface of the hard roller. The outer layer preferably has a thickness between 1 and 10 mm, and even more preferably about 3 mm. This outer layer thickness is greater than that of known metal layers, which makes the application easier. For example, the application of the outer layer can be achieve by pouring, spraying or rolling, all without requiring the addition of heat. The increased outer layer thickness increases the resistance of the outer layer to breaking or cracking.

In a preferred embodiment, the inner layer has a modulus of elasticity between 3,000 and 30,000, and even more preferably between 6,000 and 7,000. The present inventors have determined that the best results in compressing of the paper web are produced within this range.

In addition, the outer layer preferably has a Shore D hardness between 65 and 95, and even more preferably between 85 and 92. This range of hardness provides the best results with respect to the compressing and the smoothness of the paper web.

The soft roller is preferably an adjustable deflection roller and the hard roller can preferably be heated. This structural arrangement provides the least expensive implementation of a soft calender, because the functions of heating and deflection adjustability are separated from one another. Additionally, the function of deflection adjustability is thoroughly compatible with the operation of a soft roller.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawing wherein:

The single FIGURE shows a cross-sectional view through a two-roller calender in accordance with the present invention.

DETAILED DESCRIPTION OF THE PREFERRED EMBODIMENT

Referring now to the drawing FIGURE, a web of paper 1, running through a roll gap 2 formed between a hard roller 3 and a flexible roller 4, is illustrated. The hard roller 3 is made of metal, preferably steel, and has a smooth outer surface 5. Outer surface 5 has a roughness $R_a$ of about 0.1 μm. Longitudinal bores 6 are disposed within hard roller 3 to permit the controlled heating of roller 3.

Soft roller 4 is comprised of a strong inner jacket 7 which is made of metal. Jacket 7 is supported on a non-rotating carrier 9 in a conventional manner with the aid of support elements 8 (only one of which is shown for the sake of clarity in the drawing FIGURE). Elements 8 are placed next to each other and the amount of support provided by each element 8 can be controlled individually. A coating 10 is disposed on jacket 7. Coating 10 is comprised of an inner layer 11 and an outer layer 12. Inner layer 11 is preferably made of a fiberglass- or carbon fiber-reinforced epoxy resin. Outer layer 12 is preferably made of silicone rubber that is fiber-free, at least at the outer surface 13. Outer layer 12 is substantially thinner than inner layer 11. Outer surface 13 has a smoothness $R_a$ of about 0.1 μm. The wear properties of the silicone rubber are selected in such a way that the preferred smoothness of outer surface 13 does not exceed 0.5 μm even under normal operating conditions. The term "operating conditions" refers to the operational loading over the normal period of time between two roller changes, which usually take place about three months apart.

The following data apply to one non-limiting example of the present invention:

| | |
|---|---|
| Diameter of the hard roller 3 | 600 mm |
| Diameter of the soft roller 4 | 800 mm |
| Peripheral speed of the rollers | 1,400 m/min |
| Temperature of the hard roller 3 | 110° C. |
| Inner layer 11 | |
| Material: Fiber-reinforced epoxy resin | |
| Thickness: | 10 mm |
| Module of elasticity: | 6,500 |
| Outer layer 12 | |
| Material: Silicone rubber | |
| Thickness: | 3 mm |
| Hardness | 90 Shore D |
| Average roughness of the outer surface | 0.1 μm |
| Line load | 250 N/mm |

The data can be selected depending on the paper that is to be improved or on the properties that are desired for the paper.

The hard roller 3 is driven, as symbol 14 indicates. Soft roller 4 also possesses its own driving means.

Having described the presently preferred exemplary embodiment of a calender for webs of paper in accordance with the present invention, it is believed that other modifications, variations, and changes will be suggested to those skilled in the art in view of the teachings set forth herein. It is, therefore, to bo understood that all such modifications, variations, and changes are believed to fall within the scope of the present invention as defined by the appended claims.

We claim:

1. A calender for webs of paper comprising:

a hard roller having a smooth outer surface; and a soft roller disposed adjacent to said hard roller to form a roll gap therebetween, said soft roller having a coating made of flexible plastic, said coating being comprised of an inner layer and an outer layer, said inner layer being made of a first plastic material and said outer layer being made of a second plastic material, wherein said outer layer has lesser flexibility and greater hardness than said inner layer.

2. The calender according to claim 1, wherein said outer layer has an outer surface having wear properties such that under normal operating conditions the average roughness $R_a$ does not exceed 0.5 μm.

3. The calender according to claim 2, wherein said average roughness $R_a$ does not exceed 0.1 μm.

4. The calender according to claim 1, wherein said second plastic material is a silicone rubber.

5. The calender according to claim 4, wherein said first plastic material is an epoxy resin.

6. The calender according to claim 1, wherein said first plastic material is an epoxy resin.

7. The calender according to claim 1, wherein said outer layer has a thickness between 1 and 10 mm.

8. The calender according to claim 7, wherein said outer layer thickness is approximately 3 mm.

9. The calender according to claim 1, wherein said inner layer has a modulus of elasticity between 3,000 and 30,000.

10. The calender according to claim 9, wherein said inner layer modulus of elasticity is between 6,000 and 7,000.

11. The calender according to claim 1, wherein said outer layer has a Shore D hardness between 65 and 95.

12. The calender according to claim 11, wherein said outer layer Shore D hardness is between 85 and 92.

13. The calender according to claim 1, wherein said soft roller is an adjustable deflection roller.

14. The calender according to claim 13, wherein said hard roller includes a means for heating said hard roller.

* * * * *